United States Patent
Nuqui et al.

(10) Patent No.: US 9,755,896 B2
(45) Date of Patent: Sep. 5, 2017

(54) COLLABORATIVE DEFENSE OF ENERGY DISTRIBUTION PROTECTION AND CONTROL DEVICES

(75) Inventors: Reynaldo Nuqui, Cary, NC (US); Le Tang, Cary, NC (US)

(73) Assignee: ABB Research Ltd., Zurich (CH)

( * ) Notice: Subject to any disclaimer, the term of this patent is extended or adjusted under 35 U.S.C. 154(b) by 561 days.

(21) Appl. No.: 12/472,532

(22) Filed: May 27, 2009

(65) Prior Publication Data

US 2009/0299542 A1 Dec. 3, 2009

Related U.S. Application Data

(60) Provisional application No. 61/056,551, filed on May 28, 2008.

(51) Int. Cl.
| | | |
|---|---|---|
| G05D 17/00 | (2006.01) | |
| H04L 12/24 | (2006.01) | |
| G06Q 50/06 | (2012.01) | |
| H04L 29/06 | (2006.01) | |
| H02H 3/00 | (2006.01) | |
| H04L 29/08 | (2006.01) | |

(52) U.S. Cl.
CPC ......... *H04L 41/0813* (2013.01); *G06Q 50/06* (2013.01); *H04L 41/0803* (2013.01); *H04L 63/1441* (2013.01); *H02H 3/006* (2013.01); *H04L 67/12* (2013.01); *Y04S 40/24* (2013.01)

(58) Field of Classification Search
CPC ...... Y04S 10/18; Y04S 40/24; H04L 41/0803; H04L 41/813; H04L 41/0813
USPC .................. 700/286, 292; 726/23, 26, 27
See application file for complete search history.

(56) References Cited

U.S. PATENT DOCUMENTS

| | | | |
|---|---|---|---|
| 6,195,587 B1 * | 2/2001 | Hruska et al. | 700/2 |
| 6,285,917 B1 * | 9/2001 | Sekiguchi et al. | 700/239 |
| 6,446,113 B1 * | 9/2002 | Ozzie et al. | 709/204 |
| 6,571,153 B1 * | 5/2003 | Maeda et al. | 700/292 |
| 6,751,562 B1 * | 6/2004 | Blackett | G05B 19/4185 340/635 |
| 6,792,337 B2 | 9/2004 | Blackett et al. | |
| 6,944,555 B2 | 9/2005 | Blackett et al. | |

(Continued)

FOREIGN PATENT DOCUMENTS

| | | |
|---|---|---|
| CN | 1258123 A | 6/2000 |
| CN | 1768518 A | 5/2006 |

(Continued)

OTHER PUBLICATIONS

Xhou et al. "A Peer-to-Peer Collaborative Intrusion Detection System", 2005.*

(Continued)

*Primary Examiner* — Steven Kim
(74) *Attorney, Agent, or Firm* — Taft Stettinius & Hollister LLP

(57) ABSTRACT

A method is disclosed for preventing malicious settings changes to IEDs in a power transmission and distribution network. Attempted changes to the protection settings of an IED is detected and transmitted to one or more neighboring IEDs. The neighboring IEDs check for consistency of the new settings and return conformance or nonconformance signals. If a nonconformance signal is received, the attempted setting change is not allowed.

21 Claims, 5 Drawing Sheets

(56) References Cited

U.S. PATENT DOCUMENTS

| | | | |
|---|---|---|---|
| 7,031,266 B1* | 4/2006 | Patel | H04L 45/02 370/254 |
| 7,188,003 B2 | 3/2007 | Ransom et al. | |
| 7,415,725 B2* | 8/2008 | Henneberry et al. | 726/17 |
| 7,426,694 B2* | 9/2008 | Gross et al. | 715/762 |
| 7,489,977 B2* | 2/2009 | Duffy et al. | 700/79 |
| 7,721,321 B2* | 5/2010 | Risley | H04L 63/0428 713/150 |
| 7,814,535 B1* | 10/2010 | Barile et al. | 726/5 |
| 8,165,841 B2* | 4/2012 | Vetter | H04L 43/028 702/122 |
| 9,282,001 B2* | 3/2016 | Bell | H04L 12/4625 |
| 2002/0188624 A1* | 12/2002 | Landin | 707/203 |
| 2004/0025018 A1* | 2/2004 | Haas | H04L 45/26 713/168 |
| 2004/0138835 A1* | 7/2004 | Ransom | G01D 4/004 702/62 |
| 2004/0193912 A1 | 9/2004 | Li | |
| 2005/0080655 A1* | 4/2005 | Sengir | G06Q 10/0633 705/7.27 |
| 2005/0144437 A1 | 6/2005 | Ransom et al. | |
| 2005/0251296 A1* | 11/2005 | Nelson et al. | 700/292 |
| 2006/0034305 A1* | 2/2006 | Heimerdinger et al. | 370/408 |
| 2006/0101833 A1* | 5/2006 | Lucas et al. | 62/126 |
| 2006/0121418 A1* | 6/2006 | DeMarco | G05D 1/0088 434/11 |
| 2006/0133454 A1* | 6/2006 | Beckwith | H04W 92/18 375/140 |
| 2007/0055612 A1* | 3/2007 | Palestrant et al. | 705/37 |
| 2007/0136297 A1* | 6/2007 | Choe | 707/10 |
| 2007/0147415 A1* | 6/2007 | Marusca et al. | 370/465 |
| 2007/0250873 A1 | 10/2007 | Ohyama | |
| 2008/0108405 A1* | 5/2008 | Brosnan | G07F 17/32 463/16 |
| 2008/0127210 A1* | 5/2008 | Bosold | H04L 67/025 719/313 |
| 2008/0162930 A1* | 7/2008 | Finney | H04L 63/083 713/165 |
| 2008/0234872 A1* | 9/2008 | Vetter | G06F 17/2247 700/286 |
| 2008/0301765 A1* | 12/2008 | Nicol | H04L 41/142 726/1 |
| 2009/0070051 A1* | 3/2009 | Vetter et al. | 702/57 |
| 2010/0204851 A1* | 8/2010 | Yuen et al. | 700/297 |
| 2010/0204948 A1* | 8/2010 | Kirrmann | G01R 31/3272 702/117 |
| 2011/0004355 A1* | 1/2011 | Wang | H02H 7/261 700/286 |
| 2012/0198226 A1* | 8/2012 | Wimmer | G06F 21/57 713/100 |

FOREIGN PATENT DOCUMENTS

| | | |
|---|---|---|
| CN | 101594006 B | 6/2014 |
| WO | 2006028455 A1 | 3/2006 |

OTHER PUBLICATIONS

S.H. Horowitz, A.G. Phadke, Power system Relaying, New York: Wiley, 1995, p. 84-94.

S.Tamronglak and S.H.Horowitz, A.G. Phadke, J.S. Thorp,"Anatomy of Power System Blackouts; Preventive Relaying Strategies, " IEEE Trans. on Power Delivery, vol. 11. No. 2, Apr. 1996, pp. 708-715.

IEC 61850 Communication Networks and Systems in Substations, [Online]. Available: http;//www.61850.com/.

D. Conte de Leon, J. Alves-Foss, A. Krings, and P. Oman, "Modeling complex control systems to identify remotely accessible devices vulnerable to cyber attack," First Workshop on Scientific Aspects of Cyber Terrorism, Washington D.C., Nov. 2002.

Kopp, K., "European Search Report for European Patent Application No. 09160910.7," Nov. 23, 2009, European Patent Office, Munich, Germany.

Closson, J.R., Young, M., "Commissioning Numerical Relays," Conference record of the 2001 Annual Pulp and Paper Industry Technical Conference, Portland, OR, 2001, pp. 81-91, IEEE, New York, NY.

State Intellectual Property Office of People's Republic of China, Office Action for corresponding Chinese patent application No. 200910145214.7, Issued Aug. 5, 2013.

State Intellectual Property Office of People'S Republic of China, Office Action for corresponding Chinese patent application No. 200910145214.7, Issued Nov. 28, 2012.

* cited by examiner

COLLABORATIVE DEFENSE OF ENERGY DISTRIBUTION PROTECTION AND CONTROL DEVICES

CROSS REFERENCE TO RELATED APPLICATION

This application claims the benefit of U.S. provisional patent application No. 61/056,551 filed on May 28, 2008 and entitled Collaborative Defense of Energy Distribution Protection and Control Devices, which is hereby incorporated by reference in its entirety.

BACKGROUND

Electric transmission and distribution systems are increasingly exposed to cyber attacks. Some of the exposure can be traced to electric power industry's shift to open protocols and standards (e.g. TCP/IP over Ethernet LANs/WANs) for communicating data across the network. These open standards are rapidly gaining acceptance as utilities increasingly migrate to the next generation of IP addressable Intelligent Electronic Devices (IEDs). Remote access is becoming increasingly a standard feature for most of these IEDs. The risk of cyber attack on the devices is aggravated by utility relay department's procedural weakness against unauthorized access to IEDs. The Federal Energy Regulatory Commission's (hereinafter FERC) Critical Infrastructure Protection standards were meant to address this security risk by enforcing mandatory requirements on IT security based procedures. For example, FERC news release of Jan. 17, 2008 stated that the "mandatory reliability standards require certain users, owners and operators of the bulk power system to establish policies, plans and procedures to safeguard physical and electronic access to control systems, to train personnel on security matters, to report security incidents, and to be prepared to recover from a cyber incident."

Still further complicating security, new power system markets now require an ever increasing openness to network data. For example, FERC Order 888 and 889 allow public access to certain types of transmission data. Such network information could provide an attacker a glimpse of vulnerable sections of the power system. Similarly, increased network interconnection of previously isolated control systems increases the security risks associated with the data communication. Likewise, unmanned substations are increasingly becoming vulnerable to unauthorized physical entries.

On the IT front, there are ever-increasing examples of electronic theft and so called "hactivism." Cyber attacks have the potential to disable a bulk electric power system. According to one attack scenario, a cyber-attacker could remotely change relay characteristics of a local IED to mis-coordinate the tripping devices. On a larger scale, an attacker could change relay characteristics of a plurality of IP addressable IEDs in a network resulting in mis-coordination of the tripping devices. According to another attack scenario, a hacker could indirectly control breaking devices by maliciously changing relay characteristics such that the local IED will issue a trip signal. These attacks could have immediate and damaging effects and could trigger cascading events leading to power system collapse. For example, a hacker could set the relay characteristics to cause tripping at present loading conditions. In this manner, a cyber attacker could shut down a substation or any portion of a subsystem by controlling a compromised IED.

Alternatively, one could delay the malicious effects until a normal disturbance occurs in a system. This type of cyber attack could be accomplished by purposefully miscoordinating line protection relays resulting in the tripping of more lines than is necessary. In such cases, the compromised relays would reveal intrusion some time after the initial attack.

There is thus a need in the art for improved security measures for energy protection and control devices to minimize risks associated with malicious attacks.

SUMMARY OF THE INVENTION

According to one aspect of the present invention, a method is provided for preventing malicious settings changes to one of a plurality of IEDs in a power network. An attempted change to the protection settings of a first IED in the power network is detected. The attempted change to the protection settings of the first IED is transmitted to a second IED in the power network. The attempted change to the protection settings of the first IED is checked for consistency with the protection settings of the second IED. A nonconformance signal is transmitted to the first IED from the second IED if the attempted change to the protection settings of the first IED are not consistent with the protection settings of the second IED. The attempted change to the protection settings of the first IED is denied upon receipt of a nonconformance signal.

According to another aspect of the present invention, computer readable medium is carried in one or more IEDs in a power network. The computer readable medium contains computer executable instructions which, when executed by a computer, perform a method for preventing malicious settings changes to one of a plurality of IEDs in a power network. An attempted change to the protection settings of a first IED in the power network is detected. The attempted change to the protection settings of the first IED is transmitted to a second IED in the power network. The attempted change to the protection settings of the first IED is checked for consistency with the protection settings of the second IED. A nonconformance signal is transmitted to the first IED from the second IED if the attempted change to the protection settings of the first IED are not consistent with the protection settings of the second IED. The attempted change to the protection settings of the first IED is denied upon receipt of a nonconformance signal.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
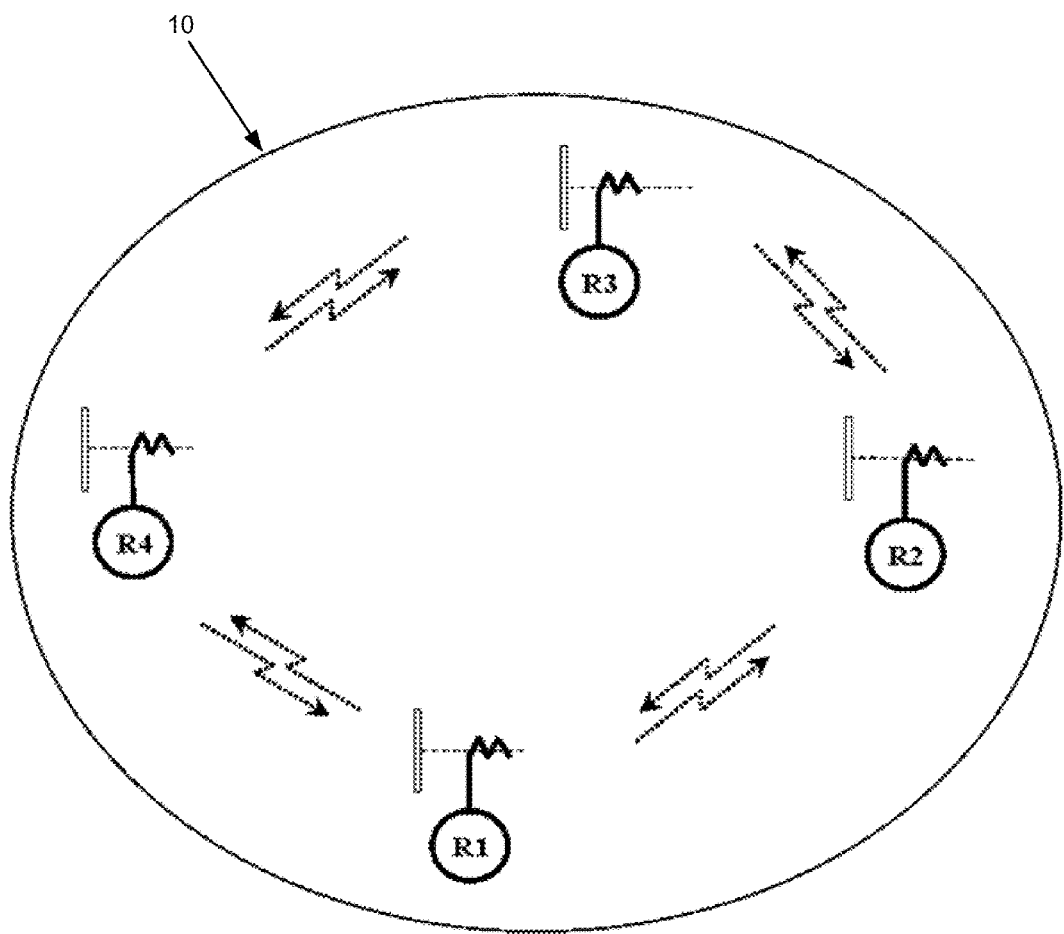
FIG. 1 shows a schematic view of a power network having a plurality of IEDs.

With reference now to the figures, an electrical transmission and/or distribution network is indicated generally by the numeral 10 and is shown schematically in FIG. 1. As shown, the network 10 includes a plurality of IEDs. An IED is typically a microprocessor-based electronic device that sends control signals to switching devices, such as circuit breakers, reclosers, and switches in power systems. IEDs available today combine many functions such as monitoring, protection, control, reclosing elements, power quality monitoring, and communications. Protection functions supported by IEDs may include time delay and instantaneous over-current functions for phase and ground elements, sequence directional over-current functions, reclosing functions, over- and under-frequency protection functions, and over- and under-voltage protection functions. IEDs may be configured locally, using the front panel of the IED device or remotely using software tools and communication links.

In the presently disclosed embodiment, the IEDs are in the form of relays R1-R4, though other types of IEDs may be used. Relays R1-R4 are in communication with one another and positioned at various spaced intervals in the distribution network. The IEDs receive data from sensors and power equipment. If a voltage or current irregularity is sensed, the IEDs may issue control commands to associated protection equipment, such as tripping circuit breakers or reclosers. The IEDs communicate with each other in real-time and exchange information such as relay characteristics, protection setting changes, and status of controlled devices. In other embodiments, the IEDs could be programmed to poll neighbors at a regular interval. In still other embodiments, the IEDs could be programmed to communicate upon certain events, such as an attempted change to an IED characteristic. In one embodiment, IEC 61850 is the communication protocol for data exchange over the network of devices. It should be appreciated that other protocols may be employed, for example, the Distributed Network Protocol (DNP) V3.00. The IEDs may communicate over any communications infrastructure including, for example, WiFi wireless communication, fiber optic networks, and broadband over power lines.

As will be described in greater detail below, whenever an attempted change is made to the operating characteristics of an IED, the affected IED communicates the attempted changes to other IEDs in the distribution network. In one or more embodiments, the affected IED communicates with the immediate upstream and downstream IED neighbors. The neighbor IEDs in turn confirm or reject the attempted changes according to stored protection rules. This peer-to-peer collaborative defense system enforces a domain-based security layer, which utilizes protection relaying principles that are based on physical laws governing the electrical network, to detect attacks to the electrical infrastructure. The presently disclosed system consequently reinforces and complements existing IT based security layers such as encrypted communication protocols, physical security and utility procedures such as protection against social engineering attacks, where an attacker obtains sensitive information using human interaction.

Figure 2:
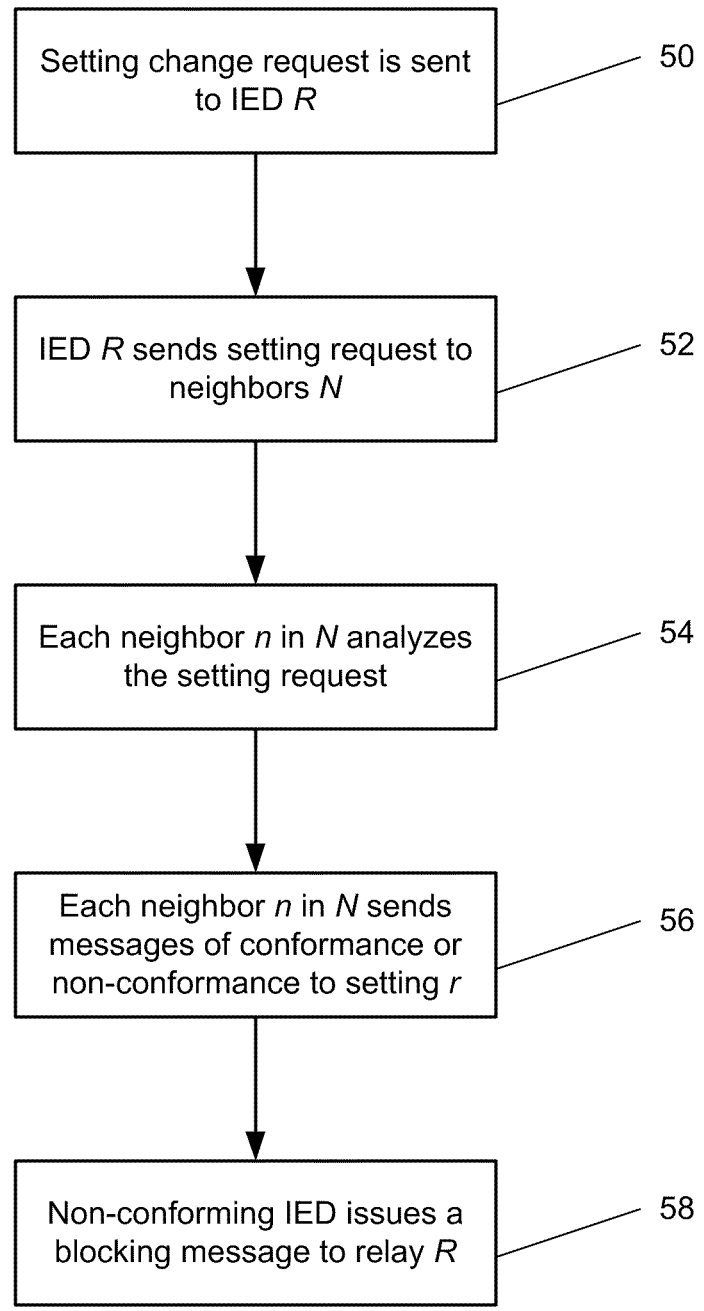
FIG. 2 illustrates the process according to one embodiment of the present invention.

The inter-IED collaborative verification employed in the system of the present invention is provided to parry malicious attacks attempting to change device protection settings. With reference now to FIG. 2, the protective method is described in greater detail. At 50 an attacker gains access to an IED R and initiates a setting change. The compromised IED R communicates with its neighboring IEDs N at 52. In one embodiment, the neighboring IEDs N may include the immediate upstream and downstream IED neighbors. Such a configuration may be advantageous when, for example, the IEDs are current limiting relays with a coordination protection scheme. In other embodiments, the neighboring IEDs could include a predetermined subset of all IEDs in the particular distribution or transmission network. In still other embodiments, the compromised IED communicates with all IEDs in a particular distribution or transmission network.

The message sent by the compromised IED may include the proposed setting changes, identification and/or location of the IED, time of request, source of the request (i.e. locally or remotely), the IP address and domain of the client machine initiating the changes, etc. At step 54, the neighboring IEDs determine the consistency of the attempted change with their own settings according to predefined protection rules. Thus, for example, in the embodiment wherein the IEDs are current limiting relays, the neighboring IED may check if the new settings are coordinated with its own settings. The neighboring IED may then issue a message of conformance or non-conformance to the new settings at 56. According to one embodiment, if one IED issues a veto, or noncompliant setting message, then the compromised IED denies the attempted change at 58. Concurrently, an alarm may be issued by either or both the compromised IED and the vetoing IED of the attempted change. The alarm may be sent through any communications infrastructure, such as a dedicated network for the IEDs, the substation automation system, or a SCADA system.

According to another embodiment, instead of denying the requested change upon receipt of a non-conformance message from a neighboring IED, the compromised IED denies the settings change request if, after a predetermined period of time, a conformance message is not received from the neighboring IEDs. Such an arrangement prevents potential circumvention of the protection system by disabling the communications system of the IED. According to still another embodiment, the IED denies the settings change request if either a non-conformance message is received or no conformance message is received in a predetermined period of time.

Each IED in a power distribution network may be embedded with a conformance algorithm for determining the conformance of received settings based on a given protection criteria. The protection criteria may be, for example, correct coordination of the IED with respect to the upstream and downstream neighbors. The conformance algorithm may differ for varying types of IEDs based on varying relaying philosophies, such as line distance protection, line pilot protection, line over-current protection, etc.

Figure 3:
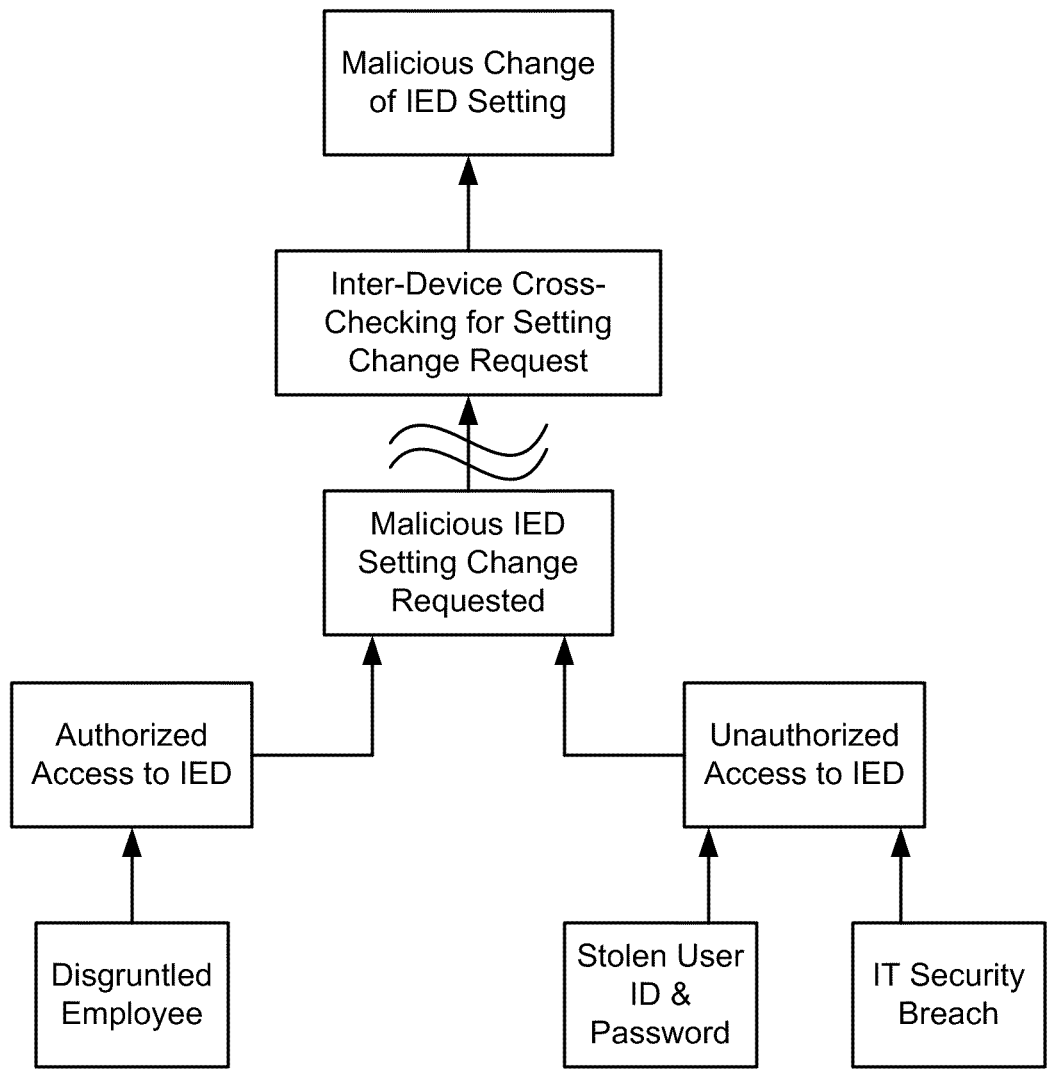
FIG. 3 illustrates a plurality of methods of causing a malicious IED setting change request.

When the inter-IED conformance algorithm is operational, the likelihood of success for unauthorized and/or malicious setting changes is greatly diminished. As can be seen in FIG. 3, the system according to the present invention protects against attacks by authorized users such as disgruntled employees. The present invention also protects against unauthorized users who use a stolen password/ID or who otherwise hack into the network. Still further, the system protects against accidental human errors, wherein a maintenance person inputs an incorrect setting change that might disrupt coordination.

As discussed above, one exemplary protection setting may be inter-IED coordination. Typically, coordination is set by the relay engineer using established coordination setting procedures. Theoretically, a mapping of the IED relay settings S may be a function of power system graph G, the network sequence impedances $X_{012}$, and the set of loads $I_L$ and generators $I_G$:

$$S \rightarrow f(G, X_{012}, I_L, I_G)$$

Typically, settings S remain static with time, unless changes are initiated by the transmission or distribution owner. In such a case, the initiated change may be expressed as:

$$S+\Delta S$$

The conformance algorithms as referred to in this invention consists of domain-based relaying algorithms used to detect conformance of requested IED settings to an operating criteria such as, for example, relay coordination. Thus, the algorithms make use of physical laws of electricity as well as electrical networks, for example, Ohm's Law, Kirchoff's Current and Voltage Laws. In short, the algorithms are realizations of a test such that the relationship $S \rightarrow f(G, X_{012}, I_L, I_G)$ remains valid for a new setting $S+\Delta S$.

The conformance algorithms stored on the IEDs could be expressed in terms of certain parameters. The parameters depend on the type of IED/relay. For example, an over-current relay's parameters may include time-dial settings and current pick-up. For a distance relay, the parameters could include the R/X zone operating characteristic and zone operating times. Attempted settings changes are fed into a rule engine executed in each of the neighboring IEDs that is designed to detect nonconformance with that particular IED. The rules may be coded into the IED using any means.

Figure 4:
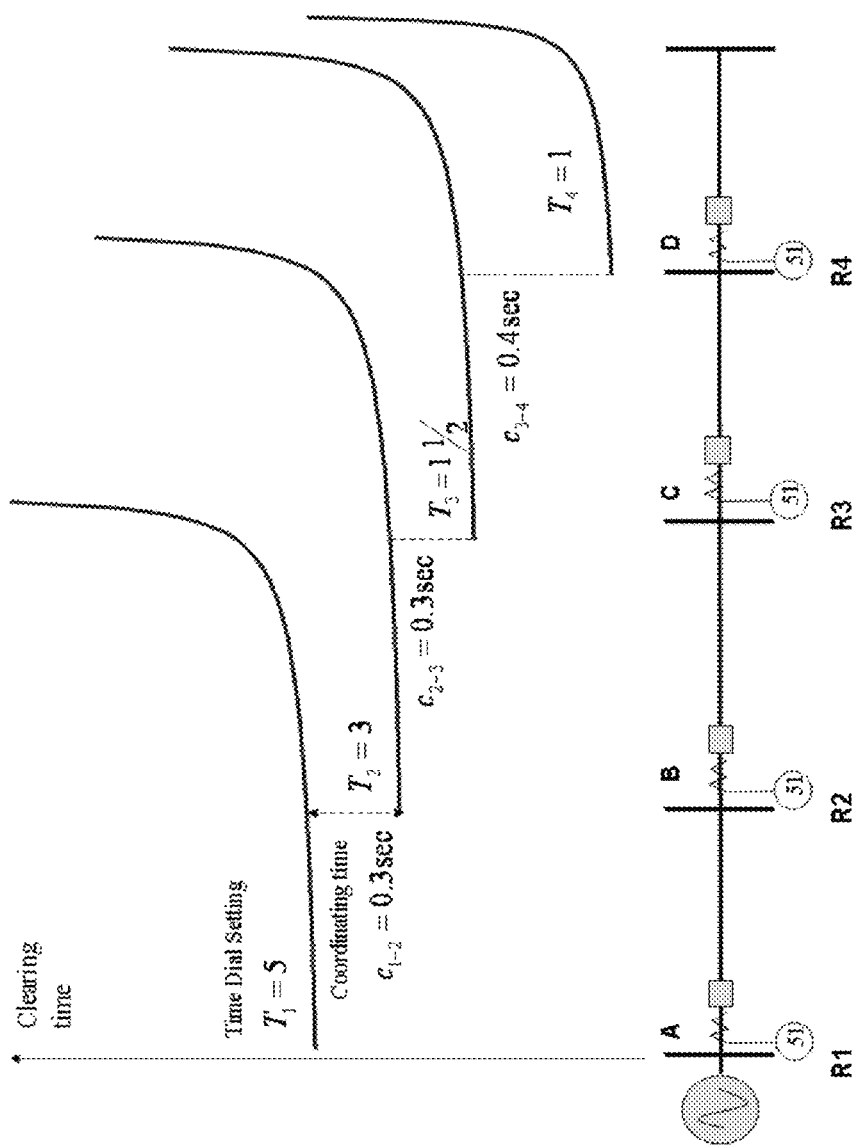
FIG. 4 is a chart showing proper coordination for a time-delay feeder over-current scheme.

With reference to FIG. 4, one embodiment of the present invention tests for coordination of feeder over-current relays. In the disclosed example, the following setting rules apply:

(1) Each relay pick-up setting $I_p$ is set so that the relay opens upon recognition of a fault current in its own zone of protection and that of the next downstream feeder section. The relay pick-up setting is the minimum amount of current at which the relay operates. In other embodiments, under-voltage relays may be used, wherein the relay operates at values smaller than the pick-up value, and take no action for values above the pick-up value. A given relay's zone of protection extends downstream of the relay to the next relay. A relay's pick-up setting $I_p$ should be set lower than the relay upstream thereof, so that the closest relay clears the fault.

(2) Each relay time dial setting $T_j$ is set so that it operates with a minimum time delay for faults in its own zone of protection but slow enough to allow the downstream relay to clear the fault in the next downstream feeder section $T_{j+1}$. For over-current relays, time dial settings correspond to a unique operating characteristic that relates the operating time of the relay as a function of the magnitude of the fault current. The time dial setting is set such that it will also include a coordinating time such as breaker operating time $c_{j+1}$. The coordinating time is a time delay added to an immediate upstream relay to let the local breaker trip if possible. The breaker operating time is the time it takes for the breaker to open, starting from the time it receives the trip signal from the relay.

According to one embodiment, the conformance algorithms of the present invention could be represented by rule formulations. For example, valid setting changes to the above referenced pick-up currents and time-dial setting should pass the following rules T and P below for conformance, where $t_k^j(T_j)$ and $t_k^{j+1}(T_{j+1})$ are the upstream relay $R_j$ and downstream relay $R_{j+1}$ operating times given the indicated time dial settings $T_j$ and $T_{j+1}$ respectively, and coordinating time $c_{j+1}$ of relay $R_{j+1}$. $I_p$ and $I_d$ are the upstream relay $R_j$ and downstream relay $R_{j+1}$ pick up current settings, while $\epsilon$ is the minimum difference in the relays' pick up current settings. In one embodiment, the rules are tested for all credible fault conditions $\forall k$ in the $R_{j+1}$ relay's zone of protection.

$T$: If $t_k^j(T_j) > t_k^{j+1}(T_{j+1}) + c_{j+1}$ $P$: If $I_p > I_d + \epsilon$ If each rule T and P result in true statements, the settings are in conformance.

According to another embodiment, the conformance algorithm implementation rules could be expressed in terms of inequality constraints. For example, the time coordination in a feeder time delay over-current protection with N over-current relays as previously presented could be expressed as a set of constraints relating any two relay's time delay settings.

$$t_k^1(T_1) - t_k^2(T_2) > c_{2,1}$$
$$\vdots$$
$$t_k^j(T_j) - t_k^{j+1}(T_{j+1}) > c_{j+1,j}$$
$$\vdots$$
$$t_k^{N-1}(T_{N-1}) - t_k^N(T_N) > c_{N,N-1}$$

Where $c_j$'s represent the minimum coordinating times between neighboring relays. Again, as with above, for each relay pair, if the statement is true, the settings are in conformance with one another.

Additionally, the minimum and maximum thresholds may be monitored. In general, $S_j^{min}, S_j^{max}$ refers to threshold values of relay j's setting parameters $S_j$. An example is a minimum threshold $S_j^{min}$ for the pick-up current to ensure that the relay will not pick up normal load currents.

$$S_j < S_j^{max}$$

$$S_j > S_j^{min}$$

Similarly, relationship between the pick-up current settings $I_N, I_{N-1}, \ldots I_j, \ldots I_2, I_1$ of relays $R_N, R_{N-1}, \ldots R_j, \ldots R_2, R_1$ could be expressed in terms of inequalities, where $\epsilon_{j+1,j}$ is defined as the minimum allowable difference in the pick-up currents of relay $R_{j+1}, R_j$.

$$I_1 - I_2 > \varepsilon_{2,1}$$
$$\vdots$$
$$I_j - I_{j+1} > \varepsilon_{j+1,j}$$
$$\vdots$$
$$I_{N-1} - I_N > \varepsilon_{N,N-1}$$

The above discussed rule embodiments are merely exemplary, as any number of rule configurations may be implemented. For example, variants may be required for configurations with back feed sources, or with active electrical injections along the feeder. In any of the configurations, a predetermined number of IEDs issue a decision whether the attempted settings satisfy the setting rules in relation to that particular IED.

It should be appreciated that in other relaying schemes, different setting rules apply. Such schemes include, for example, distance protection and differential protection. The conformance algorithms of a given IED may embody the rules of each of these protective relaying schemes. Such rules may be codified in appropriate language and deployed in the IEDs. For example, the rules may be written in C programming language, compiled, and deployed to a digital relay's real time operating system (RTOS).

Several transmission schemes may be provided for transmitting attempted settings changes. According to one embodiment, the attempted setting change is transmitted to only the minimum set of IEDs required to check coordination. Thus, for over-current relays this may include only the relays immediately upstream and/or downstream thereof. For other types of relays that operate on non-spatial relationships, such as under-frequency relays, the minimum set of IEDs may be all IEDs in the distribution or transmission network, or some predefined subset.

Figure 5:
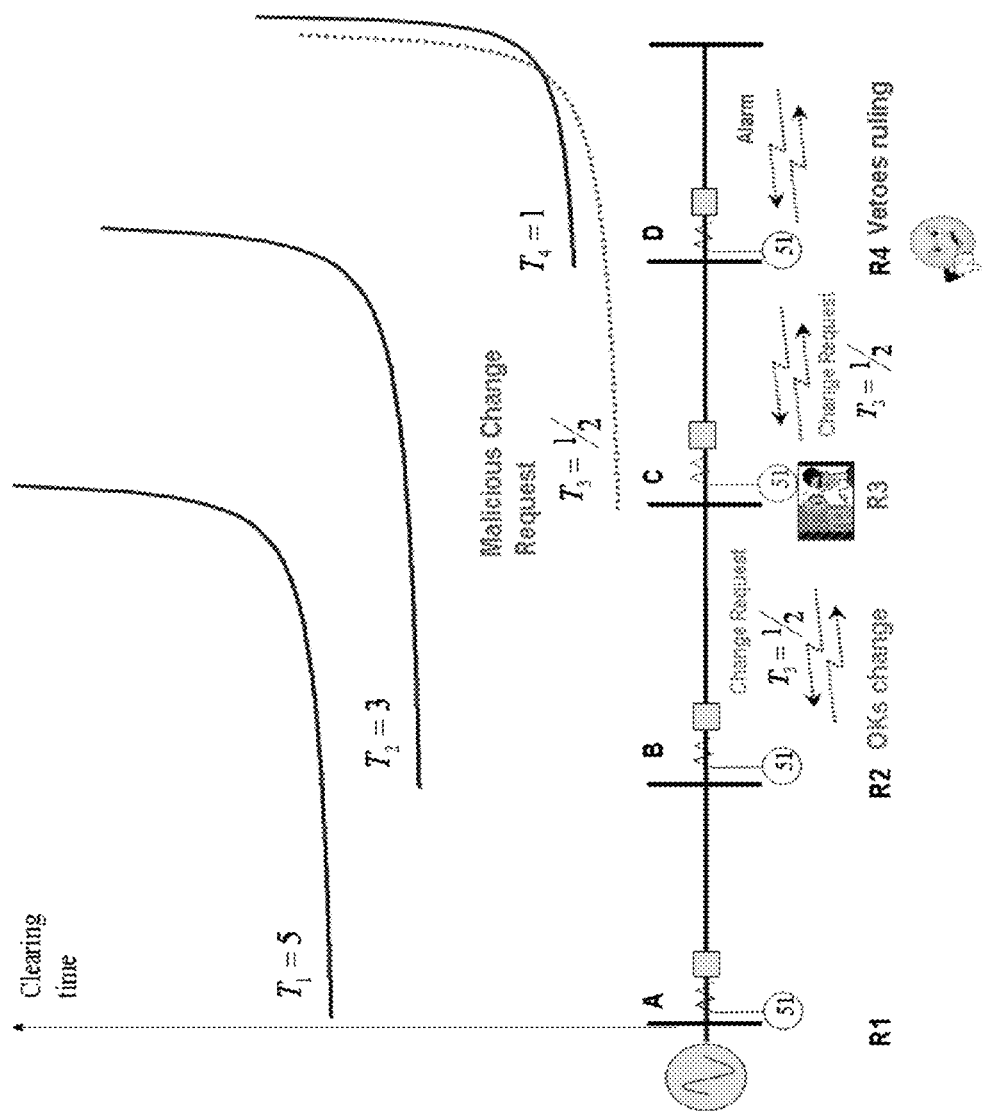
FIG. 5 is a chart showing an improper coordination for a time-delay feeder over-current scheme caused by a malicious change request.

With reference now to FIG. 5, an illustration is provided for a time-delay feeder over-current scheme. As can be seen, an attack on over-current relay R3 is shown wherein the attacker attempts to change the time dial setting. Upon receipt of setting change request, R3 transmits the attempted time dial change request ($T_3=\frac{1}{2}$) to its neighboring relays R2 and R4. The neighboring relays analyze the setting request for time coordination and pick up coordination using the conformance algorithms. As shown in FIG. 5, the new setting is acceptable to R2, that is, the rule coordinating relays R2 and R3 operating time $T:t_k^2(T_2) > t_k^3(T_3 \rightarrow T_{1/2}) + c_3$ is TRUE for all faults within relay's R3 zone of protection. R2 then transmits a conformance statement to R3 indicating that the proposed changes are acceptable. However, R4 detects a miscoordination with its own settings, that is, $T:t_k^3(T_3 \rightarrow T_{1/2}) > t_k^4(T_4) + c_4$ is FALSE for at least some faults within relay R4's zone of protection. R4 then transmits a non-conformance statement to R3. R3 then denies the requested settings change. Concurrently, R4 transmits an alarm to the distribution system operator.

According to another embodiment, the inter-IED cross checking may be performed on a wider scale so that, for example, some subset, or even all IEDs in a feeder circuit check the conformance of any attempted settings changes. Any setting change request message is sent to all the members of this predetermined group. In such an embodiment, each IED may store all the current IED settings in the group as well as the conformance algorithms. Thus, in the embodiment shown in FIG. 5, the change request would also be confirmed by relay R1.

Though the embodiments discussed above reference relays, it should be appreciated that the inter-IED cross checking schemes presented herein can apply to other types of IEDs such as, for example, programmable logic controllers, digital fault recorders, phasor measurement units, and power quality meters.

As will be appreciated by one of ordinary skill in the art, the present invention may be embodied as or take the form of the method and system previously described, as well as of a computer readable medium having computer-readable instructions stored thereon which, when executed by a processor, carry out the operations of the present inventions as previously described. The computer-readable medium may be any medium that can contain, store, communicate, propagate, or transport the program instructions for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the previously described technical results.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of preventing malicious settings changes to one of a plurality of IEDs in a power network, the method comprising,
    detecting an attempted change to protection settings of a first IED in the power network;
    transmitting the attempted change to the protection settings of the first IED to a second IED in the power network, wherein the second IED has protection settings different from the protection settings of the first IED and includes at least one predefined protection rule for the protection settings of the first IED;
    the second IED checking whether the attempted change to the protection settings of the first IED will result in the protection settings of the first IED not satisfying the at least one predefined protection rule, such that the first IED and the second IED would be miscoordinated with respect to their respective protection settings;
    the second IED transmitting a nonconformance signal to the first IED in response to the checking by the second IED determining the attempted change will result in the protection settings of the first IED not satisfying the at least one predefined protection rule for the protection settings of the first IED; and
    the first IED denying the attempted change to the protection settings of the first IED upon receipt of the nonconformance signal from the second IED.

2. The method of claim 1 wherein the attempted change to the protection settings includes a change to a time dial setting or a current pick-up setting.

3. The method of claim 1 further comprising transmitting the attempted change to the protection settings of the first IED to a third IED in the power network that stores at least one predefined protection rule for the protection settings of the first IED, and the third IED transmitting a nonconformance signal to the first IED in response to determining the attempted change will result in protection settings of the first IED not satisfying at least one predefined protection rule for the protection settings of the first IED.

4. The method of claim 3 wherein the second IED is immediately downstream of the first IED and the third IED is immediately upstream of the first IED.

5. The method of claim 1 wherein checking whether the attempted change to the protection settings of the first IED will result in the protection settings of the first IED not satisfying the at least one predefined protection rule for the protection settings of the first IED comprises checking whether the protection settings of the first IED will be miscoordinated in time with the protection settings of the second IED.

6. The method of claim 1 further comprising sending an alert from the first IED or the second IED to an operator of the power network if the attempted change to the protection settings of the first IED will result in the protection settings of the first IED not satisfying the at least one predefined protection rule for the protection settings of the first IED.

7. The method of claim 1 wherein transmitting the attempted change to the protection settings of the first IED to the second IED in the power network comprises the first IED transmitting the attempted change to the protection settings of the first IED to the second IED.

8. A non-transitory computer readable medium carried in first and second IEDs in a power network, the computer readable medium containing computer executable instructions which, when executed by at least one processor in the first and second IEDs, cause the at least one processor to perform a method of preventing malicious settings changes to one of a plurality of IEDs in a power network, the method comprising,
    detecting an attempted change to protection settings of the first IED in the power network;
    transmitting the attempted change to the protection settings of the first IED to the second IED in the power network, wherein the second IED has protection settings different from the protection settings of the first IED and includes at least one predefined protection rule for the protection settings of the first IED;
    the second IED checking whether the attempted change to the protection settings of the first IED will result in the protection settings of the first IED not satisfying the at least one predefined protection rule, such that the first IED and the second IED would be miscoordinated with respect to their respective protection settings;
    the second IED transmitting a nonconformance signal to the first IED from the second IED in response to the checking by the second IED determining the attempted change will result in the protection settings of the first IED not satisfying the at least one predefined protection rule for the protection settings of the first IED; and
    the first IED denying the attempted change to the protection settings of the first IED upon receipt of the nonconformance signal.

9. The computer readable medium of claim 8 wherein the attempted change to the protection settings includes a change to a time dial setting or a current pick-up setting.

10. The computer readable medium of claim 8 wherein the method further comprises transmitting the attempted change to the protection settings of the first IED to a third IED in the power network.

11. The computer readable medium of claim 10 wherein the second IED is immediately downstream of the first IED and the third IED is immediately upstream of the first IED.

12. The computer readable medium of claim 8 wherein checking whether the attempted change to the protection settings of the first IED will result in the protection settings of the first IED not satisfying the at least one predefined protection rule for the protection settings of the first IED comprises checking whether the protection settings of the first IED will be miscoordinated in time with the protection settings of the second IED.

13. The computer readable medium of claim 8 wherein the method further comprises sending an alert from the first IED or the second IED to an operator of the power network if the attempted change to the protection settings of the first IED will result in the protection settings of the first IED not satisfying the at least one predefined protection rule for the protection settings of the first IED.

14. The computer readable medium of claim 8 wherein transmitting the attempted change to the protection settings of the first IED to the second IED in the power network comprises the first IED transmitting the attempted change to the protection settings of the first IED to the second IED.

15. A method of preventing malicious settings changes to one of a plurality of IEDs in a power network, the method comprising,
    detecting an attempted change to protection settings of a first IED in the power network;
    transmitting the attempted change to the protection settings of the first IED to a second IED in the power network, wherein the second IED has protection settings different from the protection settings of the first IED and includes at least one predefined protection rule for the protection settings of the first IED;
    the second IED checking whether the attempted change to the protection settings of the first IED will result in the protection settings of the first IED satisfying the at least one predefined protection rule such that the first IED and the second IED would be coordinated with respect to their respective protection settings;
    the second IED transmitting a conformance signal to the first IED if the attempted change to the protection settings of the first IED will result in the protection settings of the first IED satisfying the at least one predefined protection rule for the protection settings of the first IED; and
    the first IED denying the attempted change to the protection settings of the first IED if no conformance signal is received from the second IED.

16. The method of claim 15 wherein the attempted change to the protection settings includes a change to a time dial setting or a current pick-up setting.

17. The method of claim 15 further comprising transmitting the attempted change to the protection settings of the first IED to a third IED in the power network, and denying the attempted change to the protection settings of the first IED if no conformance signal is received from the third IED.

18. The method of claim 17 wherein the second IED is immediately downstream of the first IED and the third IED is immediately upstream of the first IED.

19. The method of claim 15 wherein checking whether the attempted change to the protection settings of the first IED will result in the protection settings of the first IED satisfying the at least one predefined protection rule for the protection settings of the first TED comprises checking whether the protection settings of the first IED will be coordinated with the protection settings of the second IED.

20. The method of claim 15 further comprising sending an alert from the first IED or the second IED to an operator of the power network if the attempted change to the protection settings of the first IED will result in the protection settings of the first IED not satisfying the at least one predefined protection rule for the protection settings of the first IED.

21. The method of claim 15 wherein transmitting the attempted change to the protection settings of the first IED to the second IED in the power network comprises the first IED transmitting the attempted change to the protection settings of the first IED to the second IED.

* * * * *